Oct. 15, 1957  W. G. HOLZ  2,809,742
CONVEYOR BELT ATTACHMENT
Filed May 16, 1955
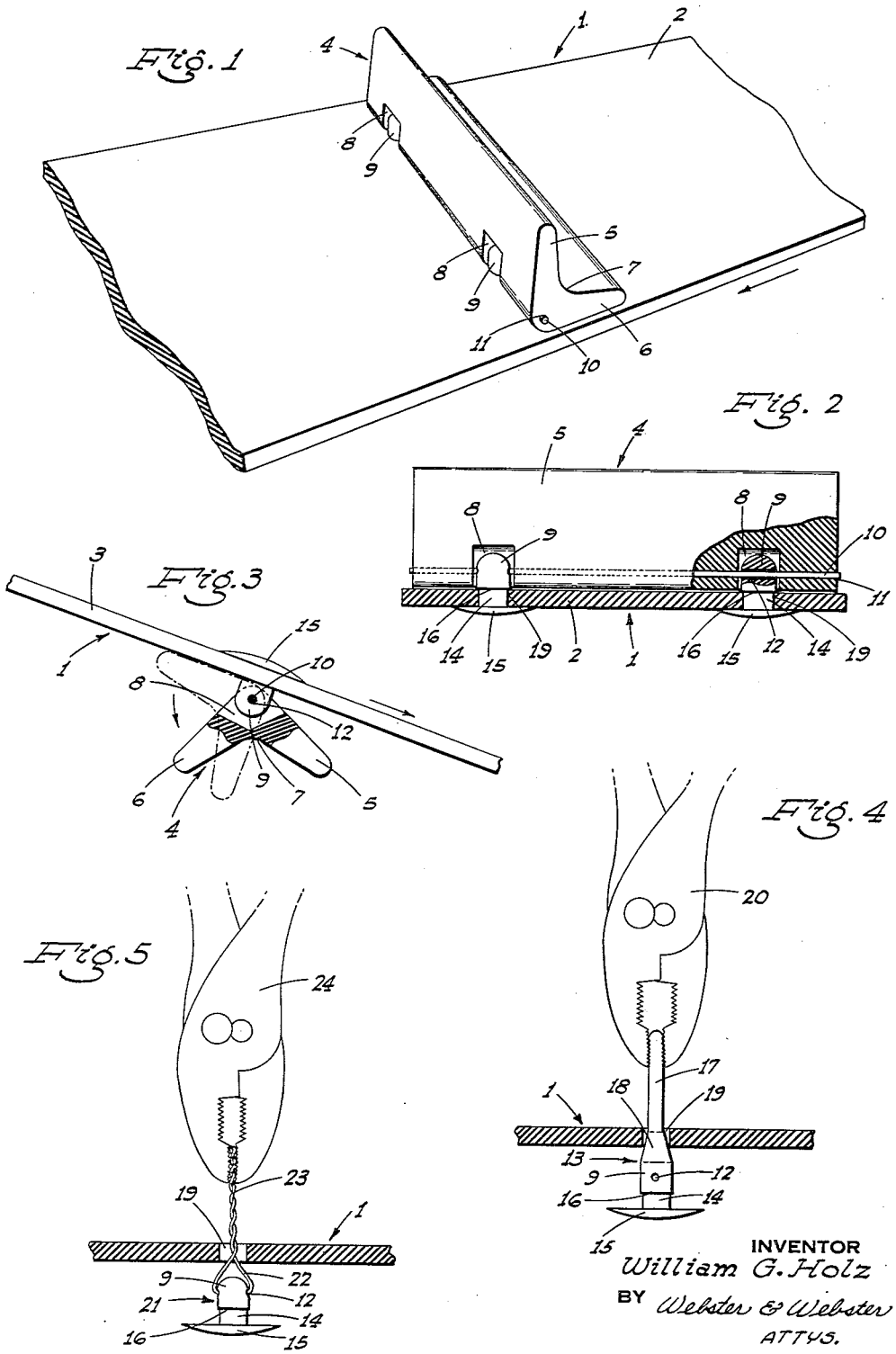
INVENTOR
William G. Holz
BY Webster & Webster
ATTYS.

United States Patent Office 2,809,742
Patented Oct. 15, 1957

2,809,742

CONVEYOR BELT ATTACHMENT

William G. Holz, Lodi, Calif.

Application May 16, 1955, Serial No. 508,456

9 Claims. (Cl. 198—199)

This invention is directed to, and it is a major object to provide, a novel, load engaging or advancing attachment for use on an endless flexible conveyor belt—of rubber or the like—which is mounted with the runs thereof extending at an angle to horizontal; there being a plurality of such attachments used on the belt in spaced relation longitudinally thereof.

Another important object of the invention is to provide a load engaging or advancing attachment, as above, which comprises a transverse cleat hingedly secured in connection with the belt for forward tipping motion, relative to the direction of travel, from a normal working position; the cleat, and the securing means in the main, being of rubber or similar resilient material for the attainment of certain advantages which will hereinafter appear.

An additional object of the present invention is to provide an attachment, for the purpose described, wherein the securing means for hingedly connecting the cleat to the belt includes novel rivet-like fasteners of rubber which extend through, and are frictionally engaged in, corresponding holes in the belt; such fasteners being thus held in place wholly without the need of vulcanization to the belt or any metallic holding element. The more specific advantages of these fasteners will likewise hereinafter appear.

It is also an object of the invention to provide a conveyor belt attachment which is designed for ease and economy of manufacture, simplicity of installation, and effective operation; the attachment being light weight but durable, quiet running, and readily adapted to stock belts.

Still another object of the invention is to provide a practical and reliable conveyor belt attachment, and one which will be exceedingly effective for the purpose for which it is designed.

These objects are accomplished by means of such structure and relative arrangement of parts as will fully appear by a perusal of the following specification and claims.

In the drawings:

Fig. 1 is a fragmentary perspective view of the upper run of an endless flexible conveyor belt; one of the attachments being shown secured thereto and disposed in load engaging or advancing position.

Fig. 2 is a front elevation of the attachment shown in Fig. 1; the belt being in section, and the cleat—together with one of the knobs—being partly in section.

Fig. 3 is a fragmentary side elevation of the lower run of the belt; the cleat being partly in section, and shown in its tipped cleaning position.

Fig. 4 is an elevation showing one manner of applying the fastener to the belt, the latter being in section.

Fig. 5 is an elevation showing another manner of applying the fastener to the belt, the latter being in section.

Referring now more particularly to the drawings, and to the characters of reference marked thereon, the attachment, which embodies the present invention, is adapted for use in connection with an endless flexible belt, indicated generally at 1, of rubber or the like; such belt including an upper run indicated in part at 2, and a lower run indicated in part at 3. The attachment is particularly useful on endless belts wherein the runs 2 and 3 are disposed at an incline relative to horizontal, as—for example—with the run 2 traveling at an upward incline, and the run 3 traveling at a downward incline.

The attachment comprises a transverse cleat, indicated generally at 4, which terminates at its ends adjacent but short of the side edges of said belt. The cleat 4, which is of relatively stiff but flexible and resilient material, such as rubber, is generally of right angle configuration in cross section, and includes a normally upstanding or working flange 5, and a rearwardly extending base flange 6 which normally seats on the belt 1 when the cleat is traveling in the upper run 2. On the rear or back side the cleat 4 is formed with a radius, as at 7, to prevent the accumulation of any material in the sharp corner which would otherwise exist.

At transversely spaced points the cleat 4 is formed with notches 8 which open from said cleat at the bottom and front; such notches being of sufficient height and depth to receive therein corresponding knobs 9 secured to and projecting outwardly from the belt 2. The knobs 9 are of rubber and are included as an integral part of fasteners, whose structure will hereinafter be described in detail.

A cross pin 10 extends through a hole 11 formed in the cleat 4 from end to end thereof; the pin intersecting the notches 8 and passing through the knobs 9, the latter having transverse holes 12 for the purpose.

As so secured in connection with the belt 1 the cleat 4 is hinged to said belt for forward tipping—in the direction of travel—from the normal working position illustrated in Fig. 1, and wherein the rearwardly extending base flange 6 rests on the belt, with the working flange 5 disposed at substantially a right angle thereto for load engagement.

The fasteners, of which the knobs 9 are a part, are shown in two embodiments, one in Fig. 4, and another in Fig. 5.

In Fig. 4, the fastener, indicated generally at 13, comprises the knob 9 connected by an integral, reduced-diameter neck 14, with an enlarged relatively flat, circular head 15; the reduction in diameter of the neck 14 forming a shoulder 16 which faces the head 15.

At the end opposite the neck 14 the knob 9 is initially in integral connection with an axially outwardly projecting stem 17 of relatively small diameter throughout its length, except near the neck 14 where it is tapered, as at 18; the taper extending away from said neck. Each fastener 13—formed one-piece as above—is of heavy-duty but flexible and resilient rubber.

The belt 1, at the desired point for each knob 9, has a circular hole 19 cut therethrough; such hole 19 being of slightly lesser diameter than that of the neck 14 of the related fastener 13. To engage such fastener 13 with the belt 1 the stem 17 is run through the hole 19 from the under side of the belt and until the taper 18 part-engages in hole 19. Thereafter, a pair of pliers 20, or a similar instrument, is engaged with the stem 17, and a forceful pull is applied thereto axially in a direction outwardly of the belt 1. This stretches and elongates the tapered portion 18, the knob 9, and the neck 14 to an extent that said tapered portion and knob pull through the opening 19, while the neck 14 pulls into the latter, with the head 15 flush against the under side of the belt. The stem 17 is then released from the pliers 20, whereupon the knob 9 expands to a diameter greater than that of the hole 19 and so that the shoulder 16 rests atop the belt. At the same time the neck 14 likewise expands and frictionally binds in the hole 19. With the fastener so secured to the belt, the stem 17—including the tapered portion 18—is cut off the knob 9 by means of a sharp knife or other similar instrumentality. Care is taken that the fastener 13 as so secured to the belt 1 is disposed with the hole 12 extending transversely for reception of the cross pin 10.

While the frictional engagement of the fastener 13 with the belt 1 is sufficient to hold such fastener in place, a rubber cement may be employed between the head 15 and the belt if desired.

The fastener illustrated in Fig. 5, and indicated generally at 21, is of the same form as in Fig. 4, except that the stem 17 and the tapered portion 18 are omitted. In order to secure the fastener 21, as in Fig. 5, to the belt 1, a wire 22 is engaged through the hole 12 in the knob 9, and thence the ends of such wire are twisted together, as at 23. With the fastener 21 under the belt 1 the twisted part of the wire 23 is passed through the hole 19 and engaged above the belt 1 with pliers, here indicated at 24. The pliers 24 are then used to pull axially outwardly on the twisted part of the wire 23, which pulls the fastener 21 into place on the belt in substantially the same manner as described in connection with the embodiment of Fig. 4. After the fastener 21 is in place the wire 22 is merely cut and removed from the knob 9.

The advantages of the described attachment on an endless flexible belt, when in operation, are as follows:

By reason of the fact that the cleat 4 is of rubber it does not damage the load, such as fruit or vegetables, carried on the belt and engaged by each such cleat. Additionally, the cleat—by reason of its flexibility and the flexibility of the fasteners 13 or 21—do not cause any stiffness of the belt at the point where the attachment is secured, so that the belt turns freely without binding as it passes about the end rollers of the conveyor.

Also, because of such flexibility, the fasteners 13 or 21 prevent any damage of the belt while working over the rollers, and which damage frequently occurs when the fasteners are of metal. Furthermore, the neck 14 of each fastener—by reason of its expansion and frictional engagement in the related hole 19—effectively seals the latter against entry of moisture into the belt, and which would otherwise cause deterioration thereof.

Another benefit of the attachment is the hinging feature; the cleats as they travel about the end rollers and return with the lower run 3 of the belt tipping forwardly relative to the direction of travel, so that the rearwardly extending base flange 6 falls clear of such run, resulting in self-cleaning of the cleat, as any foreign substance engaged between it and the belt can escape and fall away by gravity. Even when the cleat 4 is in the upper run 2 such cleat may be manually tilted or tipped to permit of cleaning or washing of the belt under the base flange 6.

The flexibility or resiliency of the transverse cleat 4 is also of advantage in that there is no tearing of the belt in the event of a mechanical hang-up of the cleat during operation of the conveyor, and the attachment—being wholly of rubber, saving and excepting the cross pin 10 which may be of plastic or the like—is not subject to any corrosion when working under conditions of moisture, or where chemicals are present.

By reason of the ease and simplicity of securing the attachment to a belt it may be accomplished on the job, and without the use of any special tools, and without removing the endless belt 1 from the end rollers.

In the event that the cleat 4, or the fasteners 13 or 21, are damaged they can be readily removed—for replacement—simply by pulling the cross pin 10 and detaching the fasteners from the belt.

While the fasteners 13 or 21 are here described as they are used in connection with the securing of a transverse cleat 4 to the endless belt 1, it is recognized that such fasteners—including the knobs 9—may be used in a similar manner to attach to the belt other types of load engaging and advancing members, as—for example—small buckets or scoops.

It is also recognized that in certain installations the cleat 4 may be omitted, and the buttons 9 alone serve as the load engaging means; the buttons—in such instance—being of a height, used in a number, and disposed in such relation on the belt to assure of proper contact with the material being conveyed.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An attachment, for an endless flexible conveyor belt, comprising a cleat extending transversely of the belt and having a working face, transversely spaced knobs secured to the belt, the cleat having notches in which the knobs are disposed, and a transverse pin hinging the cleat to the knobs for forward tilting, relative to the direction of travel, from a normal load engaging position; the depth of the notches lengthwise of the belt being greater than the width of the knobs and the latter being disposed so that the side walls of said knobs are inwardly of said working face of the cleat.

2. An attachment, for an endless flexible conveyor belt, comprising a cleat extending transversely of the belt, the cleat being of substantially right angle configuration in cross section including a forwardly facing, outwardly projecting working flange and a rearwardly extending base flange normally resting on the belt, transversely spaced knobs secured to the belt, the cleat having notches in which the knobs are disposed, and a transverse pin hinging the cleat to the knobs for forward tilting.

3. An attachment, as in claim 2, in which the notches in the cleat open both toward the belt and from the face of said working flange.

4. An attachment, for an endless flexible conveyor belt, comprising a cleat extending transversely of the belt, the cleat being of rubber, of substantially right angle configuration in cross section, and including a forwardly facing outwardly projecting working flange and a rearwardly extending base flange normally resting on the belt; transversely spaced, outwardly projecting rubber knobs secured to the belt, the cleat having notches therein which open inwardly and forwardly and in which notches the knobs are disposed, and a transverse hinge pin extending through the cleat and knobs.

5. An attachment, for an endless flexible conveyor belt, comprising a load engaging member on the belt, fasteners secured to the belt, and connecting means between the member and fasteners; each fastener including a relatively flat head engaging the belt on the under side, an axial neck on the head, the belt having a hole through which the neck extends, and a knob on the end of the neck opposite the head, the knob being of greater diameter than said neck and engaging the belt on the outside; said means connecting the member and said knobs.

6. An attachment, as in claim 5, in which the fasteners are each of resilient material whereby to permit of elongation under tension so that the knob may be drawn through the corresponding hole in the belt.

7. A fastener, for use in connecting a member to a belt, comprising a member of resilient rubber, said member including a relatively flat head adapted to engage the belt on the under side, the belt having a hole therethrough, an axial neck on the head adapted to extend through said hole, the neck initially being of greater diameter than the hole in the belt, and a knob on the end of the neck opposite the head, the knob being of greater diameter than the neck and adapted to engage the belt on the outside when the neck so extends through the hole; there being removable pull means connected to the knob adapted to initially pass through said hole and to be forcefully pulled from outside the belt whereby to elongate said knob and neck, under tension, and to draw the knob through the hole and the neck into the same.

8. A fastener, as in claim 7, in which said pull means is an initially integral stem projecting axially from the knob; there being an outwardly tapered portion on the stem adjacent the juncture with said knob.

9. A fastener, as in claim 7, in which the knob has a transverse hole therein; and said pull means is a wire passed through the hole and thence twisted together.

References Cited in the file of this patent

UNITED STATES PATENTS

| | | |
|---|---|---|
| 1,030,835 | Smith | June 25, 1912 |
| 1,263,515 | Biehler et al. | Apr. 23, 1918 |
| 1,547,276 | Wentz | July 28, 1925 |
| 2,209,403 | Kittner et al. | July 30, 1940 |
| 2,664,691 | Wiebe | Jan. 5, 1954 |